(12) United States Patent
Kuroda

(10) Patent No.: US 7,387,136 B2
(45) Date of Patent: Jun. 17, 2008

(54) FUEL PRESSURE REGULATION VALVE

(75) Inventor: Akihiro Kuroda, Kariya (JP)

(73) Assignee: Denso Corporation (JP)

( * ) Notice: Subject to any disclaimer, the term of this patent is extended or adjusted under 35 U.S.C. 154(b) by 354 days.

(21) Appl. No.: 11/246,781

(22) Filed: Oct. 11, 2005

(65) Prior Publication Data

US 2006/0075993 A1    Apr. 13, 2006

(30) Foreign Application Priority Data

Oct. 13, 2004  (JP) ............................. 2004-299109
Aug. 19, 2005  (JP) ............................. 2005-238799

(51) Int. Cl.
*F01M 1/20* (2006.01)
*F16K 17/04* (2006.01)

(52) U.S. Cl. .................. 137/516.27; 137/538; 123/446

(58) Field of Classification Search ............... 137/538, 137/516.27; 417/310; 123/446, 516
See application file for complete search history.

(56) References Cited

U.S. PATENT DOCUMENTS

| 2,011,333 | A | * | 8/1935 | Clifton ........................ 137/538 |
| 2,305,519 | A | * | 12/1942 | Dunmire ...................... 137/538 |
| 2,679,858 | A | * | 6/1954 | Kemp ...................... 137/543.23 |
| 4,161,189 | A | * | 7/1979 | Mueller, Jr. .................. 137/538 |
| 4,161,996 | A | * | 7/1979 | Dolejsi ........................ 137/538 |
| 6,352,085 | B1 | * | 3/2002 | Morita et al. ................ 137/538 |
| 6,390,072 | B1 | | 5/2002 | Breeden |
| 6,460,510 | B1 | | 10/2002 | Breeden |
| 6,481,458 | B2 | * | 11/2002 | Hirano et al. ................ 137/538 |
| 6,543,476 | B2 | * | 4/2003 | Kazaoka ...................... 137/538 |
| 6,662,784 | B1 | | 12/2003 | Breeden |
| 6,736,161 | B2 | * | 5/2004 | Kjellander et al. ......... 137/538 |
| 6,895,936 | B2 | | 5/2005 | Kuroda |
| 2002/0000217 | A1 | | 1/2002 | Takahashi et al. |
| 2002/0096146 | A1 | | 7/2002 | Breeden |
| 2003/0062030 | A1 | | 4/2003 | Oashi |
| 2003/0136384 | A1 | | 7/2003 | Linden et al. |

FOREIGN PATENT DOCUMENTS

| DE | 10247436 A1 | 5/2003 |
| EP | 1059446 A2 | 12/2000 |
| EP | 1298307 A2 | 4/2003 |
| EP | 1321663 A2 | 6/2003 |

OTHER PUBLICATIONS

Chinese Examination Report mailed Jun. 22, 2007 in Chinese Application No. 200510113608.6 with an English translation.
European Search/Examination Report - Jan. 13, 2006.

* cited by examiner

*Primary Examiner*—John Rivell
(74) *Attorney, Agent, or Firm*—Nixon & Vanderhye PC

(57) ABSTRACT

A regulation valve has: a cylinder that has an inlet port at one end side thereof to introduce the fuel thereinto, and a relief port opening on a side face thereof; a piston that is reciprocatably inserted in the cylinder to vary an opening area of the relief port in accordance with a variation of the pressure of the fuel flowing in through the inlet port; and a spring that urges the piston in a direction against the pressure of the fuel acting on the piston to regulate the pressure to be a specific value. Further, the cylinder and/or the piston is formed so that the piston opens the relief port at a relatively small speed per a unit displacement thereof in starting opening the relief port and subsequently at a relatively large speed.

10 Claims, 8 Drawing Sheets

FUEL PRESSURE REGULATION VALVE

CROSS REFERENCE TO RELATED APPLICATION

This application is based upon and claims the benefit of priority of Japanese Patent Applications No. 2004-299109 filed on Oct. 13, 2004, and No. 2005-238799 filed on Aug. 19, 2005, the contents of which are incorporated herein by reference.

FIELD OF THE INVENTION

The present invention relates to a regulation valve to regulate a fuel pressure.

BACKGROUND OF THE INVENTION

Conventionally, a pressure-accumulating fuel injection system is known that injects high-pressure fuel accumulated in a common rail into a cylinder of an internal combustion engine (refer to U.S. Pat. No. 6,895,936 and its counterpart JP-2005-36794-A). The pressure-accumulating fuel injection system is provided with a feed pump that pumps up fuel from a fuel tank and supplies the fuel to a high-pressure pump, and a regulation valve that regulates a feed pressure of the feed pump (a fuel pressure of the fuel supplied from the feed pump to the high-pressure pump).

As shown in FIG. 15A, the regulation valve is composed of a cylinder-shaped valve body 110 that has an inlet port at one end side, a piston 120 that is reciprocatably inserted inside the valve body 110, a spring 130 that is disposed behind the piston 120, and so on.

The valve body 110 is provided with relief ports 140 and an oil drain port 150 that open on a sidewall, and an oil accumulation chamber 160 that is formed behind the piston 120 and filled with fuel. The fuel in the oil accumulation chamber 160 enters and exits through the oil drain port 150 in accordance with a motion of the piston 120.

The regulation valve regulates the fuel pressure applied to the piston 120 (the feed pressure of the feed pump) to a specific value by matching the piston 120 at a position to balance the fuel pressure entering from the inlet port 100 and a summation of the fuel pressure in the oil accumulation chamber 160 and a reaction force of the spring 130. As shown in FIG. 15B, a plurality of the relief ports 140 are shaped round to have diameters equal to each other, spaced at regular intervals in a circumferential direction of the valve body 110, and placed at the same position in a moving direction (horizontal direction in the figure) of the piston 120.

Thus, the opening area of the relief port 140 in accordance with a displacement of the piston 120 varies as an opening area property shown in FIG. 16. A point O in the figure represents a piston stable position at which the motion of the piston 120 is stabilized. A1 in the figure represents a distance from the piston stable position to a valve-opening position (a position in which the piston 120 totally closes the relied port 140 in moving in a direction to close the relief port 140, or a position in which the piston 120 starts opening the relief port 140 in moving in a direction to open the relief port 140).

However, in the above-described regulation valve, when air is trapped in the fuel sucked by the feed pump, the fuel pressure applied to the piston 120 becomes unstable. Then, as shown in FIG. 5A, the piston 120 vibrates to repeat an opening and closing behavior (a behavior to open and close the relief port 140) periodically, so that a valve opening and closing noise (a groaning unusual noise) occurs. The valve opening and closing noise grates on humans' ears to cause a driver's discomfort, so that measures against the unusual noise is desired.

SUMMARY OF THE INVENTION

The present invention is achieved in view of the above-described issues, and has an object to provide a regulation valve to regulate a pressure of a fuel that is capable of decreasing a valve opening and closing noise that occurs in accordance with a vibration of a piston.

The regulation valve has: a cylinder that has an inlet port at one end side thereof to introduce the fuel thereinto, and a relief port opening on a side face thereof; a piston that is reciprocatably inserted in the cylinder to vary an opening area of the relief port in accordance with a variation of the pressure of the fuel flowing in through the inlet port; and an urging means that urges the piston in a direction against the pressure of the fuel acting on the piston to regulate the pressure to be a specific value. Further, at least one of the cylinder and the piston is formed so that the piston opens the relief port at a first speed per a unit displacement thereof at a first stage to start opening the relief port and at a second speed larger than the first speed at a second stage subsequent to the first stage.

BRIEF DESCRIPTION OF THE DRAWINGS

Other objects, features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

First Embodiment

Figure 1A:
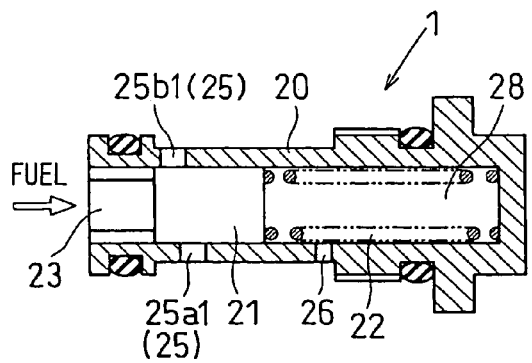
FIG. 1A is a cross-sectional view of a regulation valve according to a first embodiment of the present invention.
Figure 1B:
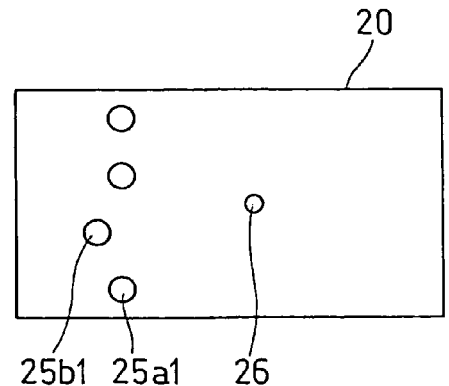
FIG. 1B is a developed view of a valve body of the regulation valve according to the first embodiment.
Figure 2:
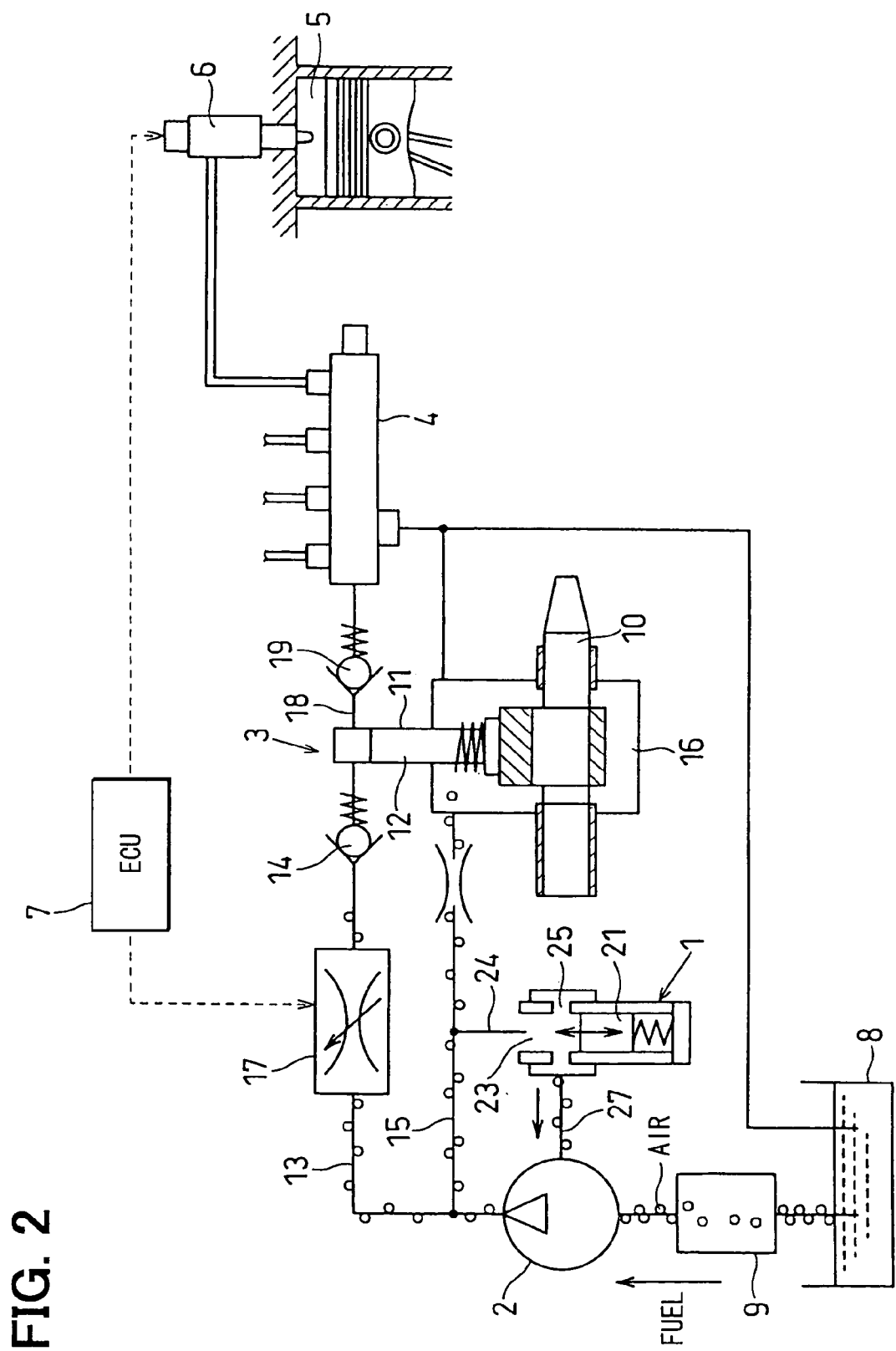
FIG. 2 is a general construction diagram of a pressure-accumulation fuel injection system applying the regulation valve according to the first embodiment therein.

FIG. 1A is a cross-sectional view of a regulation valve, FIG. 1B is a developed view of a valve body, and FIG. 2 is a general construction diagram of a pressure-accumulating fuel injection system.

A regulation valve 1 according to a first embodiment has a function to regulate a feed pressure of a feed pump 2 (a fuel pressure fed from the feed pump 2) that is applied in a pressure-accumulating fuel injection system of a diesel engine, which is shown in FIG. 2, for example.

The pressure-accumulating fuel injection system is known as a fuel injection system mainly for diesel engines, and provided with: a fuel supply pump 3 that contains the feed pump 2; a common rail 4 that accumulates the fuel pressure-fed from the fuel supply pump 3; an injector 6 that injects the high-pressure fuel supplied from the common rail 4 into a cylinder 5 of the diesel engine; and so on. An electric control unit (ECU) 7 controls a fuel pressure-feed amount of the fuel supply pump 3, injection timings and injection amounts of the injector 6, and so on.

The feed pump 2 pumps up the fuel from a fuel tank 8, pressurizes the fuel filtered by a filter 9 to a specific pressure and feeds the fuel to the fuel supply pump 3. For example, the feed pump 2 is composed of a commonly known trochoid pump, and integrally driven with the fuel supply pump 3 by the diesel engine via a camshaft 10.

The fuel supply pump 3 is provided with: a cylinder 11 that is formed in a pump housing (not shown); and a plunger 12 that is inserted in the cylinder 11. The plunger 12 reciprocates in the cylinder 11 in accordance with a rotation of the camshaft 10.

The fuel fed from the feed pump 2 flows to split into two paths downstream the feed pump 2. The fuel flowing into one path pushes a suction valve 14 provided in the suction passage 13 open to be sucked into the cylinder 11 in while the plunger 12 moves in the cylinder 11 toward the camshaft 10. The fuel flowing into the other path passes through a fuel passage 15 to be supplied to a pump cam chamber 16. A electromagnetic regulation valve 17, which is disposed upstream the suction valve 14, regulates an amount of the fuel flowing through the suction passage 13 and sucked into the cylinder 11.

The fuel sucked into the cylinder 11 is pressurized while the plunger 12 moves in the cylinder 11 in a countercamshaft side, and pushes a discharge valve 19 provided in a discharge passage 19 open to be pressure-fed to the common rail 4.

The pump camshaft chamber 16 is provided with a cam mechanism that transforms a rotational motion of the camshaft 10 into a reciprocation motion of the plunger 12, and lubricated by the fuel supplied through the fuel passage 15.

Next, a construction of the regulation valve 1 will be described.

As shown in FIG. 1A, the regulation valve 1 is composed of: a cylindrical valve body 20; a piston 21 that is reciprocatably inserted in the valve body 20; and a spring 22 that urges the piston 21 to a direction (leftward in the figure); and so on.

One end side (left side in the figure) of the valve body 20 is formed an inlet port 23 of the fuel, and the other end side is blocked. The inlet port 23 is connected with a branch passage 24 (refer to FIG. 2), which is branched from the fuel passage 15. A part of the fuel fed from the feed pump 2 flows through the branch passage 24 to the inlet port 23.

On a sidewall of the valve body 20 are formed a plurality of relief ports 25 and an oil drain port 26. The relief ports 25 are connected with a relief passage 27 (refer to FIG. 2). Thus, when the piston 21 opens the relief ports 25, the fuel entering from the inlet port 23 exits out of the relief ports 25, passes through the relief passage 27 and returns to a suction side of the feed pump 2.

The piston 21 moves in the valve body 20 to vary an opening area of the relief ports 25 in accordance with a variation of the fuel pressure entering from the inlet port 23, that is, a fuel pressure applied to a front face of the piston 21.

The spring 22 is installed behind the piston 21 (oil accumulation chamber 28) to urge the piston 21 in a direction against the fuel pressure applied on the front face of the piston 21. Thus, the piston 21 is balanced to a position in which the fuel pressure that is applied on the front face thereof (the feed pressure of the feed pump 2) balances with a summation of the fuel pressure in the oil accumulation chamber 28 that is applied on a rear face (back face) and a reaction force of the spring 22.

Next, features of the above-described regulation valve 1 will be described in comparison with a conventional regulation valve.

First, the following terms are defined.

a) "Valve opening and closing position": a position in which the piston 21 fully closes the relied ports 25 in moving in a direction to close the relief port 25 (leftward in FIGS. 1A, 1B), or a position in which the piston 21 starts opening the relief ports 25 from the full close state in moving in a direction to open the relief ports 25.

b) "Piston stable position": a front end position of the piston 21 when the motion of the piston 21 is stabilized, namely when the feed pressure of the feed pump 2 is regulated to a specific value in a case that a number of revolution of the engine NE equals 2000 rpm, for example (the front end position is a position of the front face of the piston which is subjected to the feed pressure of the feed pump 2).

c) "Valve-closing side piston travel distance": a distance from the piston stable position to the valve opening and closing position.

Figure 15A:
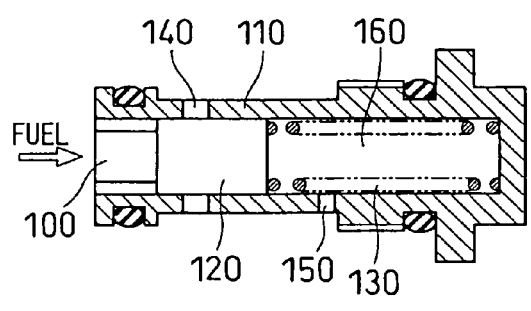
FIG. 15A is a cross-sectional view of a conventional regulation valve.
Figure 15B:
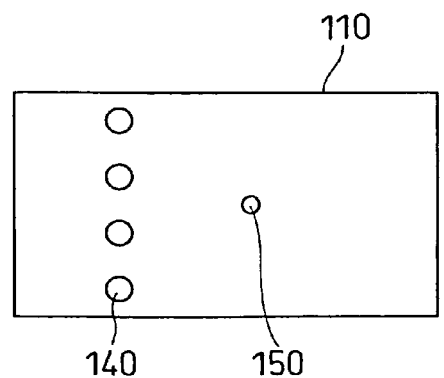
FIG. 15B is a developed view of a valve body of the conventional regulation valve.
Figure 16:
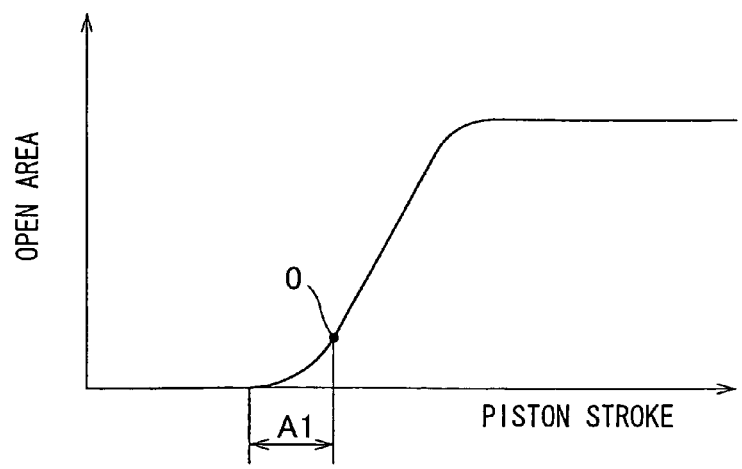
FIG. 16 is a graph showing an opening area property of the conventional regulation valve.

As shown in FIG. 15B, in a conventional regulation valve 150, all of a plurality of (four, for example) relief ports 140 that open to have round cross-section, are placed at the same position in a moving direction of the piston 120. Correspondingly, the regulation valve 1 according to the present invention is provided with a first relief ports 25a1 and a second relief port 25b1 that open at a position displaced from each other in the moving direction of the piston 21. Specifically, as shown in FIG. 1B, three first relief ports 25a1 are placed at the same position with each other, and one second relief port 25b1 is placed at a valve-closing side (counter-spring side) with respect to the first relief ports 25a1. The first and second relief ports 25a1, 25b1 have diameters equal to each other, placed to overlap partially with each other in the moving direction of the piston 21.

Thus, the regulation valve 1 according to the first embodiment is provided with: a first opening region that increases a total opening area of the relief ports 25 at a small gradient; and a second opening region that increases the total opening area of the relief ports 25 at a larger gradient than the small gradient in the first opening region. The second relief port 25b1 that is placed at the valve-closing side with respect to the first relief ports 25a1 opens in the first and second opening regions, and the first relief ports 25a1 open in the second opening region.

Figure 3:
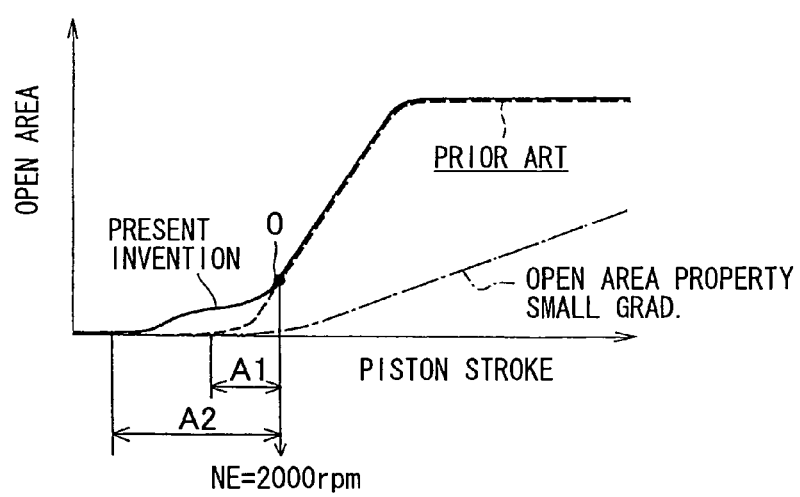
FIG. 3 is a graph showing an opening area property of the regulation valve according to the first embodiment.

Accordingly, if the variation of the opening area of the relief ports 25 in accordance with the displacement of the piston 21 is represented as an opening area property, as represented by a solid line in a graph of FIG. 3, the regulation valve 1 according to the present invention is configured so that a gradient of the valve-closing side with respect to the piston stable point (point O in the figure), which indicates an inflection point according to the present invention, is smaller than that by a conventional regulation valve (represented by a broken line if the graph of the figure). Designating the valve-closing side piston travel distance by the conventional regulation valve as A1, the valve-closing side piston travel distance by the regulation valve 1 according to the present invention is A2 that is larger than A1.

Next, an operation of the regulation valve 1 will be described.

The regulation valve 1 regulates the fuel fed from the feed pump 2 to be a specific pressure, by balancing the piston 21 at a position to balance the fuel pressure entering from the inlet port 23 with the summation of the fuel pressure in the oil accumulation chamber 28 and the reaction force of the spring 22.

If air intrudes in the fuel that is pumped up by the feed pump 2 from the fuel tank 8, the fuel pressure applied to the front face of the piston 21 becomes unstable. Thus, in the conventional regulation valve shown in FIG. 15A, the piston 120 vibrates to open and lose the relief port 140 repeatedly, so that a valve opening and closing noise occurs.

While the piston 21 repeats the opening and closing motion (a motion to open and close the relief ports 25), the piston 21 overshoots (moves past) the valve opening and closing position of the relief ports 25 in moving in a valve-closing direction. In other words, the piston 21 repeats the opening and closing motion until the overshoot converges. Accordingly, by increasing the distance from the piston stable position to the valve opening and closing position (the valve-closing side piston travel distance A2), an overshoot amount of the piston 21 past the valve opening and closing position decreases.

Figure 5A:
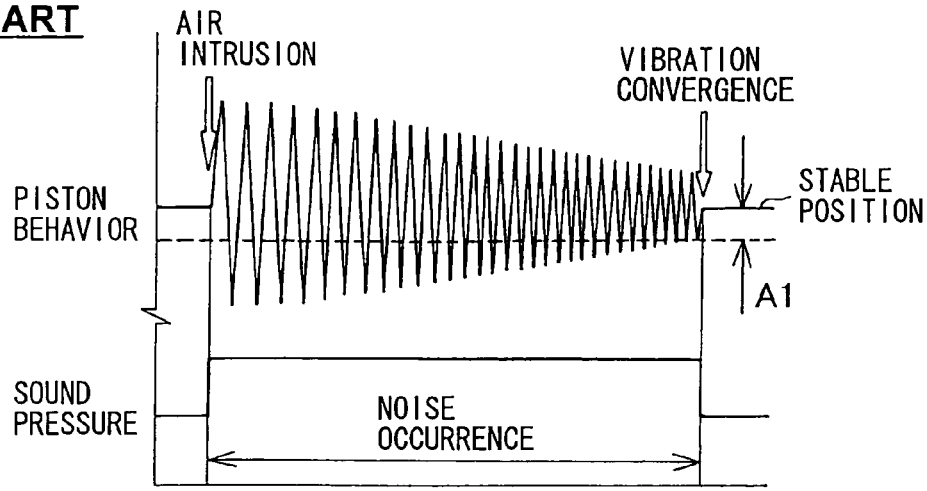
FIG. 5A is a diagram showing a piston operation and valve opening and closing noise occurrence time by a conventional regulation valve.
Figure 5B:
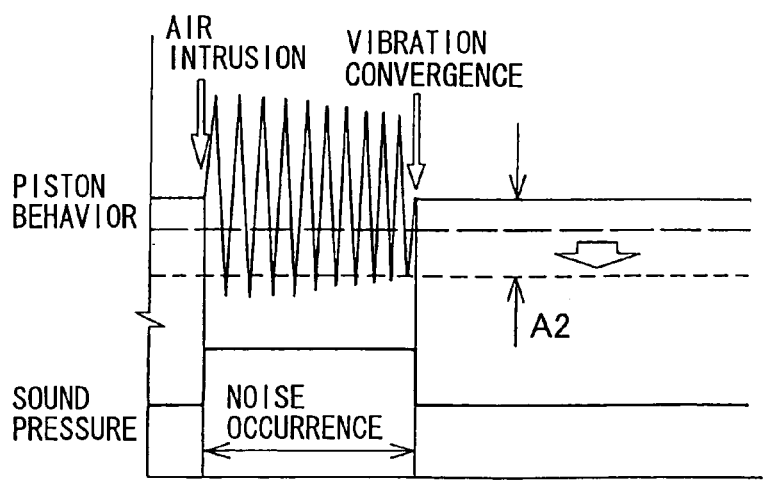
FIG. 5B is a diagram showing a piston operation and valve opening and closing noise occurrence time by the regulation valve according to the first embodiment.

In the regulation valve 1 according to the present embodiment, the valve-closing side piston travel distance A2 is set larger than that A1 in a conventional regulation valve by placing the second relief port 25b1 at the valve-closing side of the first relief valve 25a1. Thus, when the fuel pressure applied on the front face of the piston 21 (the feed pressure of the feed pump 2) rapidly changes, the overshoot amount of the piston 21 is smaller than that in the conventional regulation valve, so that the vibration of the piston 21 converges in a short time (refer to FIG. 5B).

As a result, the valve opening and closing noise occurrence time is shorter than that of the conventional one, to decrease a driver's discomfort even in an idle time in which a surrounding noise is small.

Figure 4:
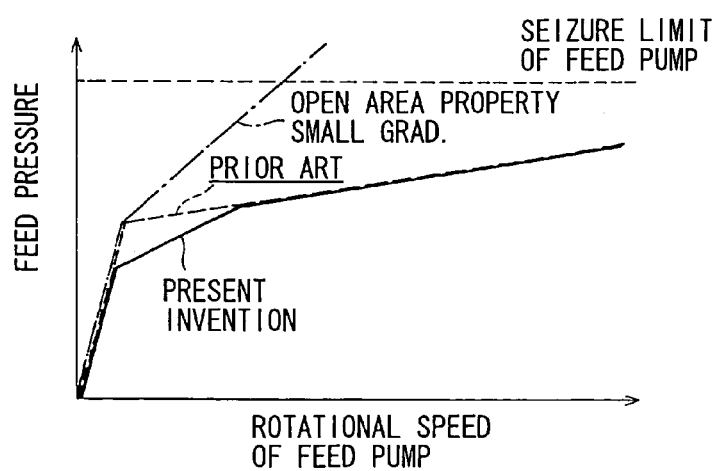
FIG. 4 is a graph showing a feed pressure property of the regulation valve according to the first embodiment.

Just by decreasing the gradient of the gradient of the opening area property of the regulation valve 1, the feed pressure becomes large in a large rotational speed region as shown in FIG. 4, and the feed pump 2 may seize up. Correspondingly, in the first embodiment, the gradient of the opening area property is set small only in a slow rotation region (NE=2000 rpm) in which a number of revolution of the feed pump 2 is small so that the feed pressure does not increase in a fast rotation region. That is, the opening area property in the fast rotation region is equivalent to that of the conventional product, so that the feed pressure is restricted from increasing to prevent the feed pump 2 from seizing.

Second Embodiment

Figure 6A:
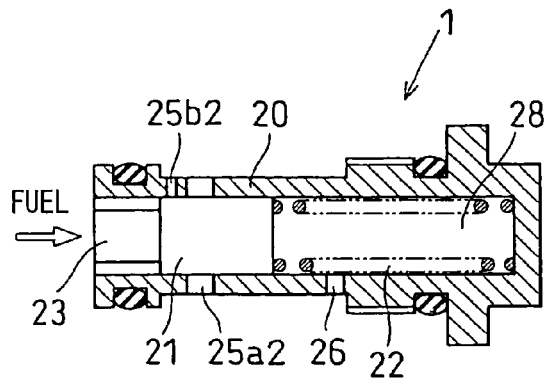
FIG. 6A is a cross-sectional view of a regulation valve according to a second embodiment of the present invention.
Figure 6B:
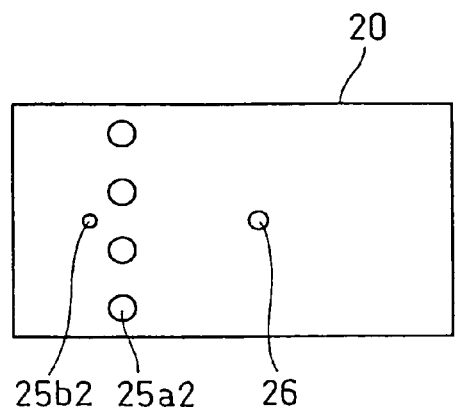
FIG. 6B is a developed view of a valve body of the regulation valve according to the second embodiment.

FIG. 6A is a cross-sectional view of a regulation valve 1, and FIG. 6B is a developed view of a valve body 20. In the regulation valve 1 according to a second embodiment, the number of first relief ports 25a2 and a position and a diameter of a second relief port 25b2 differ from those of the relief port 25 that are explained in the first embodiment.

The first relief ports 25a2 are provided at four positions at equal intervals in a circumferential direction of the valve body 20. The second relief port 25b2 has a diameter smaller than those of the first relief ports 25a2. The second relief port 25b2 is placed further at a valve-closing side than the second relief port 25b2 in the first embodiment to be separate from the first relief port 25a2 in the moving direction of the piston 21.

Figure 7:
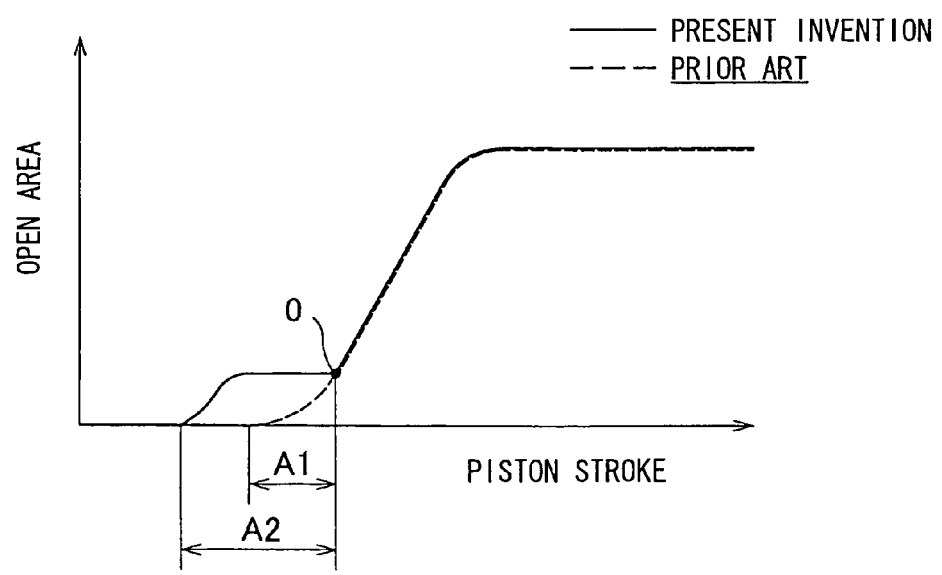
FIG. 7 is a graph showing an opening area property of the regulation valve according to the second embodiment.

FIG. 7 depicts an opening area property of the regulation valve 1. A gradient of a valve-closing side of a piston stable point (point O in the figure) is smaller than that by a conventional regulation valve (indicated by a broken line in the figure), and a valve-closing side piston travel distance A2 of the regulation valve 1 according to the second embodiment is larger than that of the valve-closing side piston travel distance A1 of the conventional regulation valve. Thus, operations and effects that are equivalent to those of the first embodiment are derived, and a vibration of the piston 21 converges in a short time to decrease a valve opening and closing noise occurrence time.

Diameters, the number and positions of the first and second relief ports 25a2, 25b2 can adopt other constructions than the first and second embodiments, provided a relation of A1>A2 is derived with respect to the valve-closing side piston travel distance.

Third Embodiment

Figure 8A:
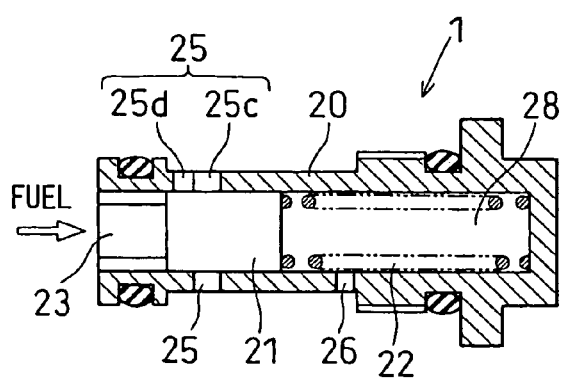
FIG. 8A is a cross-sectional view of a regulation valve according to a third embodiment of the present invention.
Figure 8B:
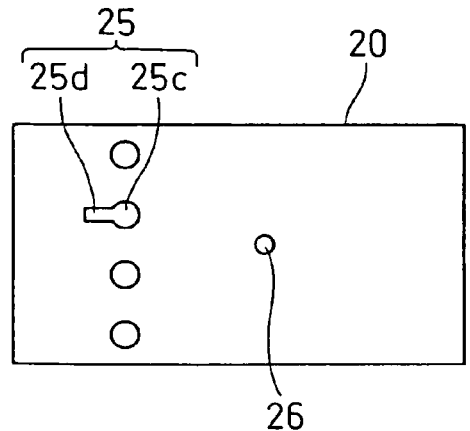
FIG. 8B is a developed view of a valve body of the regulation valve according to the third embodiment.

FIG. 8A is a cross-sectional view of a regulation valve 1, and FIG. 8B is a developed view of a valve body 20. The regulation valve 1 described in the first and second embodiments has the first relief ports 25a1, 25a2 and the second relief port 25b1, 25b2 one of which opens at different positions from the other in the moving direction of the piston 21. The first relief ports 25a1, 25a2 and the second relief port 25b1, 25b2 are independently formed from each other. Correspondingly, as shown in FIG. 8B, the regulation valve 1 according to a third embodiment has: a first opening portion 25c that opens at the piston stable position; and a second opening portion 25d that opens at the valve-closing side (counter-spring side) of the piston stable position. The first opening portion 25c and the second opening portion 25d continuously opens to be formed in one relief port 25.

Figure 9:
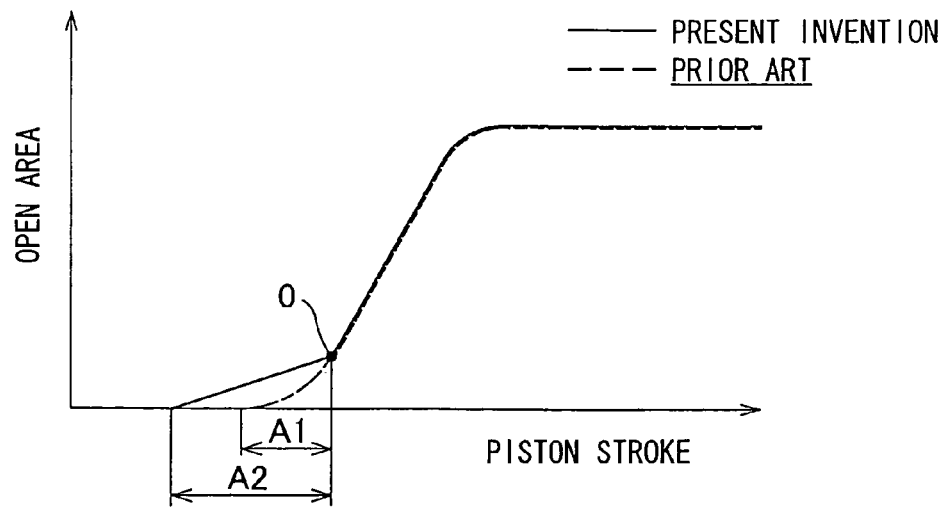
FIG. 9 is a graph showing an opening area property of the regulation valve according to the third embodiment.

Also in the construction of the third embodiment, as shown in an opening area property of FIG. 9, a relation of A2>A1 is derived with respect to the valve-closing side piston travel distance, to serve effects equivalent to those of the first and the second embodiment. A point O in the figure represents the piston stable position that indicates the inflection point according to the present invention.

Fourth Embodiment

Figure 10A:
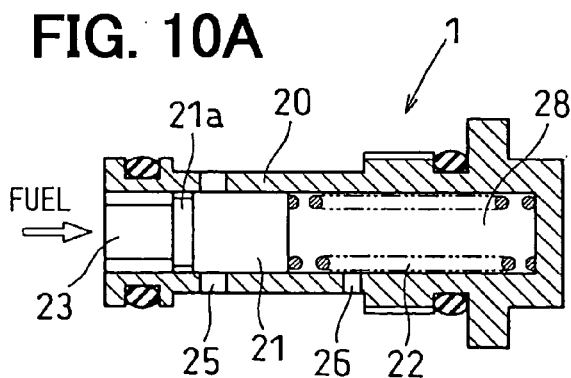
FIG. 10A is a cross-sectional view of a regulation valve according to a fourth embodiment of the present invention.
Figure 10B:
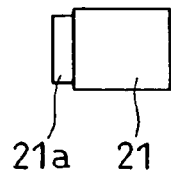
FIG. 10B is a developed view of a piston of the regulation valve according to the fourth embodiment.

FIG. 10A is a cross-sectional view of a regulation valve 1, and FIG. 10B is a developed view of a piston 21.

As shown in FIG. 10B, in the regulation valve 1 according to a fourth embodiment, an end portion of a leading end side (counter-spring side) of the piston 21, which is subjected to the feed pressure of the feed pump 2, is shrunk in a diameter in a stepped manner to provide with a small diameter portion 21a. By disposing the diameter-shrunk small diameter portion at the counter-spring side of the piston 21, effects equivalent to those of the first to third embodiments can be derived. Accordingly, it is not necessary to provide the second relief port 25b1, 25b2 for the relief ports 25 as in the first to third embodiments. In an analogous fashion to a conventional regulation valve shown in FIG. 15A, the regulation valve 1 is provided with four relief ports 25 that are placed in one position in a moving direction of the piston 21.

Figure 11:
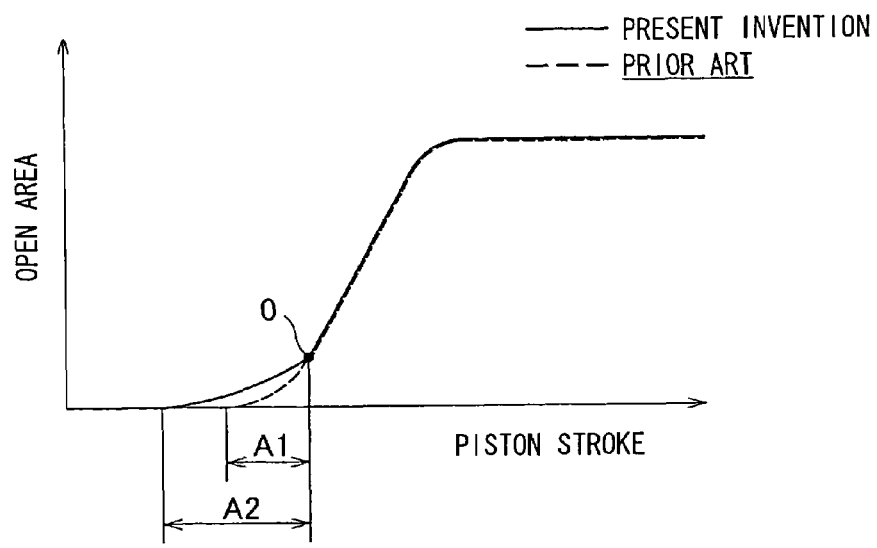
FIG. 11 is a graph showing an opening area property of the regulation valve according to the fourth embodiment.

The regulation valve 1 according to the fourth embodiment has: a first opening region in which the relief ports 25 open by a side face of the small diameter portion 21a facing with the valve-closing side peripheral portion of the relief ports 25; and a second opening region in which the relief ports 25 open at an opening are larger than in the first opening region by the piston 21 moved to the valve-opening side with respect to the first opening region. That is, the relief ports 25 are arranged as same as those in the conventional regulation valve, but the piston stable position is moved toward the valve-opening side with respect to the conventional regulation valve by providing with the small diameter portion 21a at the leading end side of the piston 21. As a result, when the piston 21 moves in a direction to open the relief ports 25, the side face (outer circumferential face) of the small diameter portion 21a faces the valve-closing side peripheral portion to open the relief ports 25 before a leading end face of the piston 21 reaches the valve-closing side peripheral portion. As a result, as shown in the opening area property of the FIG. 11, a relation of A2>A1 is derived with respect to the valve-closing side piston travel distance, therefore the vibration of the piston 21 can converge in a short time to decrease a valve opening and losing noise occurrence time, as in the first to third embodiments. A point O in the figure represents the piston stable point that indicates the inflection point according to the present invention.

Fifth Embodiment

Figure 12A:
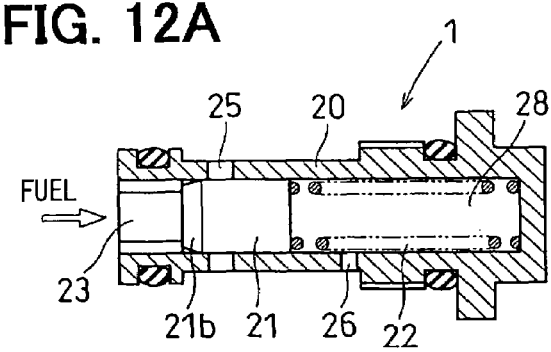
FIG. 12A is a cross-sectional view of a regulation valve according to a fifth embodiment of the present invention.
Figure 12B:
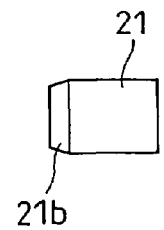
FIG. 12B is a developed view of a piston of the regulation valve according to the fifth embodiment.
Figure 12C:
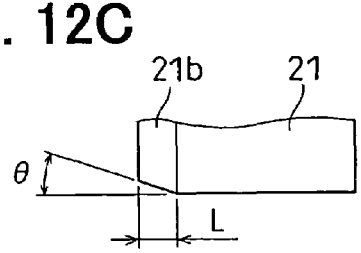
FIG. 12C is an enlarged side view of the piston of the regulation valve according to the fifth embodiment.

FIG. 12A is a cross-sectional view of a regulation valve 1, FIG. 12B is a side view of a piston 21, and FIG. 12C is a side view showing a tapered portion 21b of the piston 21.

As shown in FIG. 12B, in the regulation valve 1 according to a fifth embodiment, an end portion at a leading side (counter spring side) of the piston 21 is tapered (a portion shrunk in a tapered manner is referred to as the tapered portion 21b). As shown in FIG. 12C, in referring to a length of the tapered portion 21b as L, and taper angle of that as θ, it is desirable that L is 0.4 mm or larger and that θ is between 4 degrees and 50 degrees. As in the case of the conventional regulation valve shown in FIG. 15A, four relief ports 25 are disposed in the same position with each other in the moving direction of the piston 21.

Figure 13:
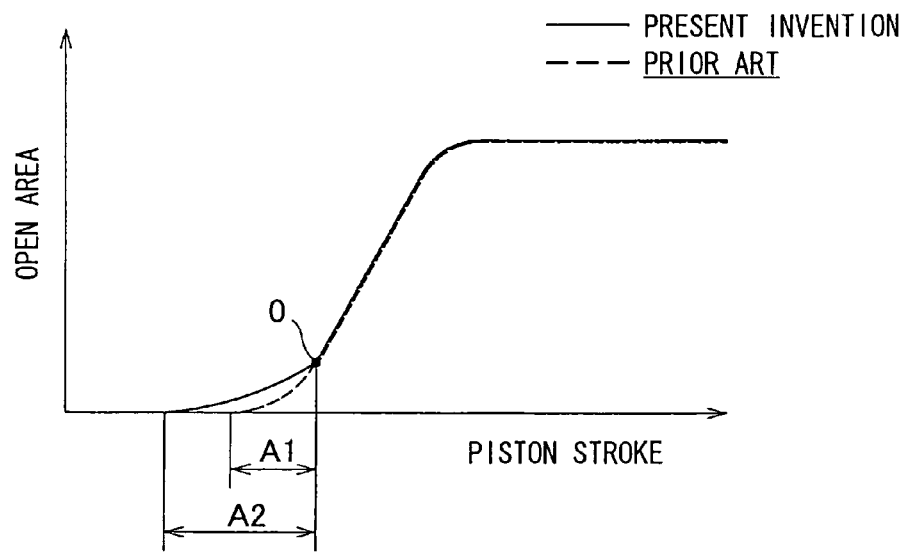
FIG. 13 is a graph showing an opening area property of the regulation valve according to the fifth embodiment.

As in the case of the fourth embodiment, in the regulation valve 1 according to the fifth embodiment, the relief ports 25 are placed at the same positions as in the conventional regulation valve. By providing with the tapered portion 21b at the counter-spring side of the piston 21, the piston stable position is displaced to the valve-opening side with respect to that of the conventional regulation valve, so that a relation of A2>A1 can be derived with respect to the valve-closing side piston travel distance as shown in an opening area property of FIG. 13, therefore the vibration of the piston 21 can converge in a short time to decrease a valve opening and losing noise occurrence time, as in the first to third embodiments. A point O in the figure represents the piston stable point that indicates the inflection point according to the present invention.

Sixth Embodiment

Figure 14A:
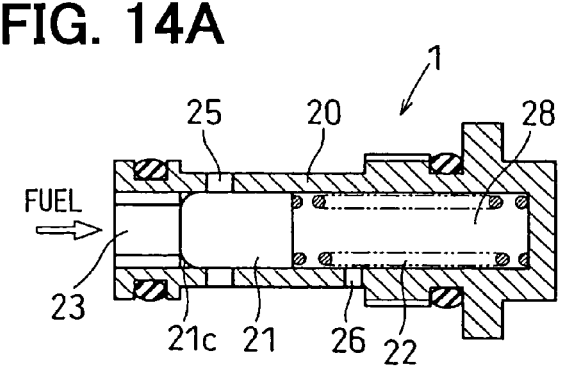
FIG. 14A is a cross-sectional view of a regulation valve according to a sixth embodiment of the present invention.
Figure 14B:
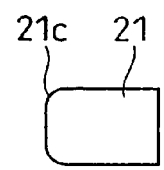
FIG. 14B is a developed view of a piston of the regulation valve according to the sixth embodiment.
Figure 14C:
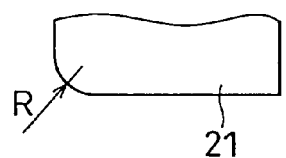
FIG. 14C is an enlarged side view of the piston of the regulation valve according to the sixth embodiment.

FIG. 14A is a cross-sectional view of a regulation valve 1, FIG. 14B is a developed view of a piston 21, and FIG. 14C is an enlarged side view showing a rounding 21c of the piston 21.

As shown in FIG. 14B, in the regulation valve 1 according to a sixth embodiment, an end portion at a leading side (counter spring side) of the piston 21 is provided with the rounding 21c over an entire perimeter thereof. As shown in FIG. 14C, the rounding 21c is a curved surface with a radius R. It is desirable that the radius R is 0.4 mm or larger. As in the case of the conventional regulation valve shown in FIG. 15A, four relief ports 25 are disposed at the same position with each other in the moving direction of the piston 21.

As in the cases of the fourth and fifth embodiments, in the regulation valve 1 according to the sixth embodiment, the relief ports 25 are disposed at the same positions as those in the conventional regulation valve. By being provided with the rounding 21c at the counter-spring side of the piston 21, the piston stable position is displaced to the valve-opening side with respect to that of the conventional regulation valve. Thus, an opening area property is equivalent to that in the case of the fourth embodiment (refer to FIG. 11), therefore a relation of A2>A1 can be derived with respect to the valve-closing side piston travel distance. As a result, a vibration of the piston 21 converges in a short time to decrease a valve opening and losing noise occurrence time with respect to that of the conventional regulation valve.

Modified Embodiments

The fuel supply pump 3 according to the first embodiment has a construction of installing the feed pump 2 therein and integrally driven by a camshaft 10 together with the feed pump 2. Alternatively, it is possible to provide the feed pump 2 separately from the fuel supply pump 3 so that the feed pump 2 and the fuel supply pump 3 are respectively driven by two camshafts independent from each other.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A regulation valve to regulate a pressure of a fuel comprising:
    a cylinder that has an inlet port at one end side thereof to introduce the fuel thereinto, and a relief port opening on a side face thereof;
    a piston that is reciprocatably inserted in the cylinder to vary an opening area of the relief port in accordance with a variation of the pressure of the fuel flowing in through the inlet port; and
    an urging means that urges the piston in a direction against the pressure of the fuel acting on the piston to regulate the pressure to be a specific value,
    wherein at least one of the cylinder and the piston is formed so that the piston opens the relief port at a first speed per a unit displacement thereof at a first stage to start opening the relief port and at a second speed larger than the first speed at a second stage subsequent to the first stage,
    wherein a stroke of the piston includes:
        a first opening region to open the relief port at the first stage; and
        a second opening region to open the relief port at the second stage and in which an opening area of the relief port per unit displacement is larger in the second opening region than the opening area per unit displacement in the first opening region,
    wherein the relief port includes a first relief port and a second relief port that are displaced from each other in a longitudinal direction of the cylinder,
    wherein the first relief port and the second relief port are separately formed and disposed to overlap each other in the longitudinal direction of the cylinder,
    wherein the second relief port is disposed in the first opening region, and the first relief port is disposed in the second opening region, and
    wherein the first relief port includes a plurality of holes, which are arranged along a circumferential direction of the cylinder.

2. The regulation valve according to claim 1, wherein the piston being provided with a small diameter portion at one longitudinal end portion thereof that is subjected to the pressure of the fuel, the small diameter portion and an inner face of the tube body providing a gap therebetween.

3. The regulation valve according to claim 2, wherein the piston is shrunk in a stepped manner at the one longitudinal end portion to provide the small diameter portion.

4. The regulation valve according to claim 2, wherein the piston is shrunk in a tapered manner at the one longitudinal end portion to extend the gap gradually toward a longitudinal end thereof to provide the small diameter portion.

5. The regulation valve according to claim 4, wherein:
    a longitudinal length of the small diameter portion is 0.4 mm or larger, and
    an inclination of a circumferential face of the small diameter portion from a longitudinal direction of the piston is between 4 degrees and 50 degrees.

6. The regulation valve according to claim 2, wherein the piston is rounded at a circumferential fringe of the one longitudinal end portion to provide the small diameter portion.

7. The regulation valve according to claim 6, wherein a rounding radius of the small diameter portion is 0.4 mm or larger.

8. The regulation valve according to claim 1 and for regulating the pressure of the fuel that is fed by feed pump driven by an internal combustion engine, wherein:
    an opening area property, which is a speed variation in opening the relief port per the unit displacement of the piston, has at least one inflection point in a region in which a revolution of the internal combustion engine is 2000 rpm or smaller;
    the first opening region is disposed at a smaller revolution side of the inflection point; and
    the second opening region is disposed at a larger revolution side of the inflection point.

9. The regulation valve according to claim 1, the regulation valve further characterized in:
    being applied to an pressure-accumulating fuel injection system that feeds the fuel by a feed pump from a fuel tank and pressurizes the fuel by a high-pressure pump to be fed to a common rail to inject the fuel accumulated in the common rail from an injector into a cylinder of an internal combustion engine; and
    regulating the pressure of the fuel fed from the feed pump to the high-pressure pump.

10. The regulation valve according to claim 1, wherein:
    the second relief port has a circular shape having a predetermined diameter, and
    each hole of the first relief port has a circular shape, which has the same diameter as the second relief port.

* * * * *